(12) United States Patent
Heo et al.

(10) Patent No.: US 10,354,113 B2
(45) Date of Patent: Jul. 16, 2019

(54) FINGERPRINT DETECTING APPARATUS CANCELING OFFSET AND CONTROL METHOD THEREOF

(71) Applicants: Crucialtec Co., Ltd., Gyeonggi-do (KR); Canvasbio Co., Ltd., Gyeonggi-do (KR)

(72) Inventors: Joo Il Heo, Jeonju-si (KR); June Shik Kim, Yongin-si (KR); Dong Ho Kim, Yongin-si (KR); Taek Moo Kim, Hwaseong-si (KR); Seong Ik Jeong, Hwaseong-si (KR)

(73) Assignees: Crucialtec Co., Ltd., Seongnam-si (KR); Canvasbio Co., Ltd., Seongnam-si (KR)

( * ) Notice: Subject to any disclaimer, the term of this patent is extended or adjusted under 35 U.S.C. 154(b) by 580 days.

(21) Appl. No.: 14/884,347

(22) Filed: Oct. 15, 2015

(65) Prior Publication Data
US 2016/0110581 A1   Apr. 21, 2016

(30) Foreign Application Priority Data

Oct. 16, 2014 (KR) .................. 10-2014-0140147
Dec. 8, 2014 (KR) .................. 10-2014-0175215

(51) Int. Cl.
*G06K 9/28* (2006.01)
*G06K 9/00* (2006.01)

(52) U.S. Cl.
CPC ................... *G06K 9/0002* (2013.01)

(58) Field of Classification Search
CPC .................................................. G06K 9/0002
See application file for complete search history.

(56) References Cited

U.S. PATENT DOCUMENTS

| 5,940,526 | A  | † | 8/1999  | Setlak   |              |
|-----------|----|---|---------|----------|--------------|
| 7,864,992 | B2 | † | 1/2011  | Riedijk  |              |
| 8,901,967 | B2 | * | 12/2014 | Nakajima | H03K 5/2481  |
|           |    |   |         |          | 327/77       |
| 2005/0024065 | A1 | * | 2/2005 | Umeda   | G01D 5/2417  |
|           |    |   |         |          | 324/663      |

FOREIGN PATENT DOCUMENTS

| JP | 2003-078365    | 3/2003  |
|----|----------------|---------|
| KR | 10-2014-0133090 | 11/2014 |
| KR | 10-1462226     | 11/2014 |

* cited by examiner
† cited by third party

*Primary Examiner* — Brian Werner
(74) *Attorney, Agent, or Firm* — H.C. Park & Associates, PLC

(57) ABSTRACT

According to an embodiment of the present invention, an apparatus for detecting a fingerprint is provided, which includes a plurality of sensor pads receiving a response signal from a finger applied to a driving signal, a sensing circuit outputting a sensing signal based on the response signal, and a sensing signal adjusting unit sampling the sensing signal outputted from the sensing circuit maintaining the sensing signal, and adjusting an average voltage level of the sensing signal based on a reference voltage.

6 Claims, 11 Drawing Sheets

(a)

(b)

FINGERPRINT DETECTING APPARATUS CANCELING OFFSET AND CONTROL METHOD THEREOF

CROSS-REFERENCE TO RELATED APPLICATIONS

This application claims the benefit under 35 U.S.C. § 119 of Korean Application Nos. 10-2014-0140147, filed Oct. 16, 2014 and 10-2014-0175215, filed Dec. 8, 2014, which are hereby incorporated by reference in their entirety.

BACKGROUND

Field of the Invention

The present invention relates to an apparatus for detecting a fingerprint and a method for controlling the same, more specifically to an apparatus for detecting a fingerprint, which acquires a fingerprint image with a constant quality, by canceling an offset differently generated according to an operation state of the apparatus for detecting the fingerprint or each sensor pad forming the apparatus for detecting the fingerprint, and a method for controlling the same.

Discussion of Related Art

Since everybody has different fingerprint patterns, fingerprints are often used in the field of personal identification. Especially, fingerprints are widely used in various fields such as finance, criminal investigation, security, etc. as a means for personal authentication.

An apparatus for detecting a fingerprint has been developed to identify an individual by recognizing his fingerprint. The apparatus for detecting the fingerprint is an apparatus recognizing a fingerprint by having a person's finger contact the apparatus, and is utilized as a means to determine whether the user is a qualified user.

As a method for implementing the apparatus for detecting the fingerprint, various methods for recognition such as an optical method, a thermal sensing method, a capacitance method, etc. have been known. Among them, an apparatus for detecting a fingerprint, which belongs to the capacitance method, acquires the shape of fingerprint (a fingerprint pattern) by detecting a change in capacitance according to valley and ridge shapes of fingerprint when the surface of the person's finger contacts a conductive sensing pattern.

Recently, portable devices provide various additional functions utilizing personal information such as finance, security, etc. as well as communication functions such as telephone or text message transmission services. Accordingly, the necessity of locking devices of portable devices is considered more important. In order to improve the locking effect of portable devices, terminals with locking devices using fingerprint recognition have been developed in earnest.

FIG. 1 is a block diagram schematically illustrating a constitution of the apparatus for detecting the fingerprint according to prior art.

In the conventional apparatus for detecting a fingerprint, even when the same fingerprint contacts the sensor pad 20, an offset generated in a device for recognizing a fingerprint, which is a basic unit constituting a sensor for recognizing a fingerprint, or an offset generated in each sensor pad 20 are different from each other. Accordingly, as the voltage value acquired varies, the quality of fingerprint image finally acquired becomes deteriorated.

Specifically, the response signal acquired by the sample and hold unit 50 from the sensing circuit 40 includes offset generated per sensor pad 20. When this offset is amplified in PGA 70, it becomes difficult to distinguish whether the part contacting the sensor pad 20 is a valley or a ridge of the finger.

Thus, in order to prevent this problem, a method of converting the voltage level acquired to be constant, by efficiently canceling an offset outputted differently per sensor pad 20 is necessary.

SUMMARY OF THE INVENTION

The present invention aims to solve the above-mentioned problem of prior art.

The present invention aims to allow an entire image of fingerprint to have a constant quality in one fingerprint image, by adjusting the offset of the voltage value generated in the sensor array.

In order to achieve the above purpose, according to an embodiment of the present invention, an apparatus for detecting a fingerprint is provided, which includes a plurality of sensor pads receiving a response signal from a finger applied to a driving signal, a sensing circuit outputting a sensing signal based on the response signal, and a sensing signal adjusting unit sampling the sensing signal outputted from the sensing circuit maintaining the sensing signal, and adjusting an average voltage level of the sensing signal based on a reference voltage.

According to an embodiment of the present invention, the sensing signal adjusting unit includes a data sample and hold unit detecting the sensing signal from the sensing circuit and outputting the sensing signal as a first sampling signal, an offset sample and hold unit detecting an offset in the sensing signal from the sensing circuit and outputting the offset as a second sampling signal, and a programmable gain amplifier (PGA) subtracting and amplifying the second sampling signal from the first sampling signal.

The offset sample and hold unit compares an output signal from the sensing circuit detected before the driving signal is applied with a reference voltage value to detect the offset.

The data sample and hold unit performs a sampling for the sensing signal from the sensing circuit detected while the driving signal is applied.

The PGA receives the first sampling signal and the second sampling signal from the offset sample and hold unit and data sample and hold unit after the application of the driving signal is terminated.

The PGA receives the first sampling signal from the offset sample and hold unit in a first period, and receives the second sampling signal from the data sample and hold unit in a second period. The first and second periods are temporally separated.

The offset sample and hold unit performs a sampling once for each sensor pad during one frame, which is a unit where a fingerprint is detected for all of the sensor pads.

The sensing circuit includes an operation amplifier, a feedback capacitor connected to a first input end and an output end of the operation amplifier, a feedback switch connecting both ends of the feedback capacitor, an input switch connecting the first input end of the operation amplifier and the sensor pads, and an output switch connecting the output end of the operation amplifier and the data sample and hold unit and the offset sample and hold unit.

According to an embodiment of the present invention, the sensing signal adjusting unit includes a sample and hold unit sampling the sensing signal, and an offset canceling unit canceling an offset between the sampled sensing signals.

The offset canceling unit includes a reference voltage providing unit providing the reference voltage, and an offset adjusting unit adjusting an average voltage level of the sensing signal based on the reference voltage.

The apparatus further includes a switch resetting a reference voltage node to which the reference voltage providing unit is connected, and a response signal input node in which a response signal from the plurality of sensor pads is inputted to the same voltage.

The reference voltage providing unit includes a transistor where an input voltage is applied to a drain electrode, and the reference voltage is applied to a gate electrode, the transistor being connected to the reference voltage node, and a resistor where one end is connected to a source electrode of the transistor, and another end is connected to the reference voltage node.

The offset adjusting unit includes a transistor where the reference voltage node to which the reference voltage is applied is connected to the drain electrode, and the gate electrode is connected to the input node, a first capacitor connecting an input end where a response signal from the sensor pad is inputted and the response signal input node, and a second capacitor connecting the reference voltage node and the response signal input node.

The apparatus further includes an amplifier amplifying an output signal from the offset adjusting unit.

In order to achieve the above purpose, according to an embodiment of the present invention, a method of operating an apparatus for detecting a fingerprint including a plurality of sensing pads sensing each response signal from a finger according to an application of a driving signal is provided, which includes detecting an offset from the response signal outputted from each sensor pad, and outputting a sensing signal reflecting the offset.

The step of detecting the offset compares the reference voltage with the output signal detected from each sensor pad, before the driving signal is applied, to detect the offset of the output signal, and wherein the outputting the sensing signal subtracts and amplifies the offset from the sensing signal outputted from each sensor pad, after the driving signal is applied.

The step of detecting the offset compares the size of the sensing signal from the plurality of sensor pads with the reference voltage to determine an offset adjusting value, and wherein the outputting the sensing signal adjusts an average voltage level of the sensing signal from the plurality of sensing pads to the reference voltage based on the offset adjusting value.

According to an embodiment of the present invention, the offset may be detected in advance before the driving signal is applied, thereby detecting offset for each sensor pad not affected by the driving signal and response signal therefor.

According to an embodiment of the present invention, the response signal from the plurality of sensor pads may be adjusted to a certain voltage range, thereby acquiring a constant quality of fingerprint image.

According to an embodiment of the present invention, the output value with the adjusted offset may be amplified, thereby greatly amplifying the difference in signal acquired from the valley and ridge of the fingerprint without noise.

According to the apparatus for detecting the fingerprint of the present invention, a fingerprint image with a constant quality is acquired, thereby improving the rate of fingerprint authentication for the same fingerprint.

The present invention is not limited to the above effects, and is to include all effects that may be inferred from the features set forth in the detailed description or the claims.

DETAILED DESCRIPTION OF EXEMPLARY EMBODIMENTS

Figure 1:
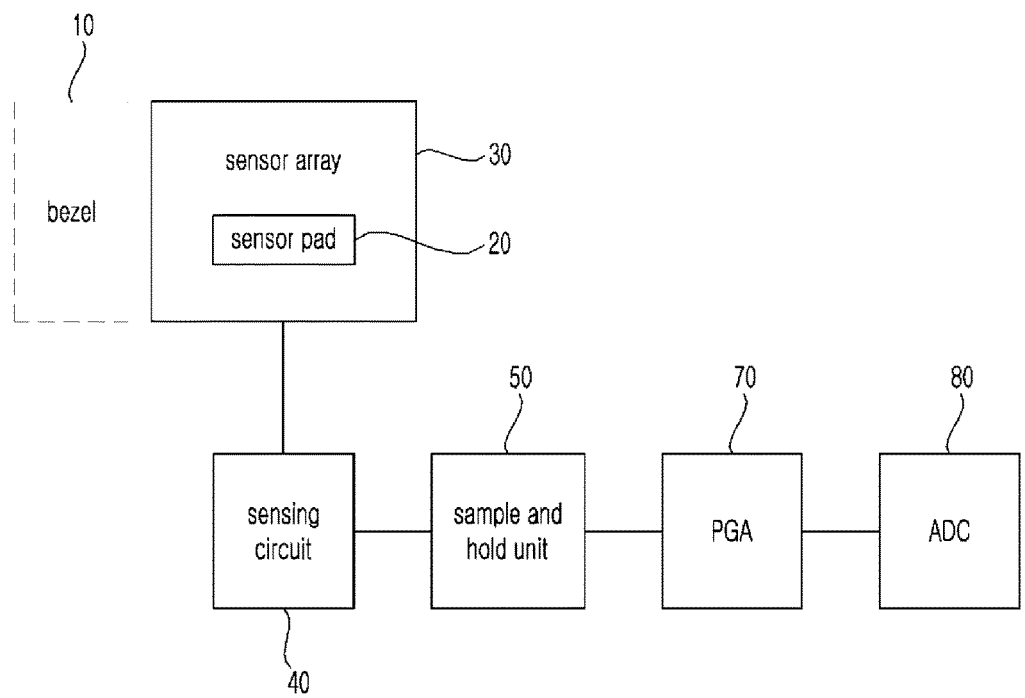
FIG. 1 is a block diagram schematically illustrating a constitution of the apparatus for detecting the fingerprint according to prior art.

Hereinafter, the present invention will be explained with reference to the accompanying drawings. The present invention, however, may be modified in various different ways, and should not be construed as limited to the embodiments set forth herein. Also, in order to clearly explain the present invention, portions that are not related to the present invention are omitted, and like reference numerals are used to refer to like elements throughout.

Throughout the specification, it will be understood that when an element is referred to as being "connected to" another element, it may be "directly connected to" the other element, or intervening elements or layers may be present. In addition, it will also be understood that when a component "includes" an element, unless there is another opposite description thereto, it should be understood that the component does not exclude another element but may further include another element.

Hereinafter, examples of the present invention will be explained in detail with reference to the accompanying drawings.

Figure 2:
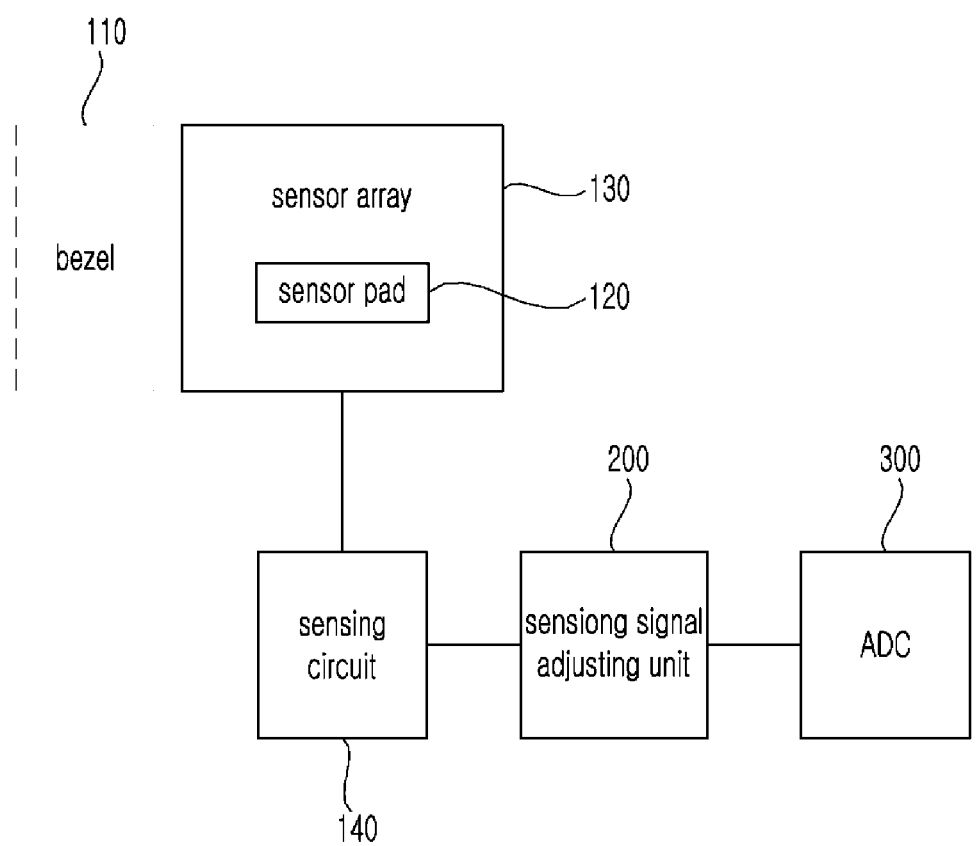
FIG. 2 is a block diagram schematically illustrating the entire constitution of the apparatus for detecting the fingerprint according to an embodiment of the present invention.

FIG. 2 is a block diagram schematically illustrating the entire constitution of the apparatus for detecting the fingerprint according to an embodiment of the present invention.

Referring to FIG. 2, the apparatus for detecting the fingerprint according to an embodiment may include a sensor pad 120, a sensor array 130, a sensing circuit 140, a sensing signal adjusting unit 200, and an ADC 300.

A bezel 110 is an edge portion surrounding the apparatus for detecting the fingerprint. According to an embodiment, a driving signal is applied to the finger through the bezel 110, and a plurality of sensor pads 120 may receive a response signal for the driving signal from the finger. According to an embodiment, the ground terminal is connected to the bezel 110 so that the noise from a peripheral portion does not affect the sensor pads, and the sensor pads 120 deliver the driving signal to the finger contacting the apparatus for detecting the fingerprint and receive the response signal thereof.

The bezel 110 may be made of various materials such as a plastic, a metal, etc. to which the driving signal may be applied, and may be protruded on at least a part of edge of the sensor performing fingerprint detection.

FIG. 2 illustrates that the bezel 110 is included as an external electrode for applying the driving signal. However, according to an embodiment of the present invention, some electronic devices do not include the bezel 110. Additionally, another constitutional element in the apparatus for detecting the fingerprint, for example, a circuit device, etc. included in the sensing device, may play a role of delivering the driving signal to the plurality of sensor pads 120.

The sensor pad 120 according to an embodiment is a basic unit for recognizing a change in capacitance according to the valley and ridge of the fingerprint. At least one sensor pad 120 is connected to the sensing circuit 140 to sense the response signal from the finger according to the application of driving signal.

The plurality of sensor pads 120 may be in the shape of a circle, a rectangle, or a diamond. However, they may be in shapes other than the above, and may be in the shape of a polygon having a uniform shape. The sensor pad 120 may be arranged in the form of adjacent polygonal matrices.

When a person's finger contacts the apparatus for detecting the fingerprint, the capacitance formed between the finger and sensor pad 120 may have a different value depending on which part of the finger touches the sensor pad 120.

Specifically, the capacitance formed according to the valley and ridge of the fingerprint varies. Due to this difference in capacitance, the apparatus for detecting the fingerprint acquires a fingerprint image.

The sensor array 130 according to an embodiment may include a plurality of sensor pads 120 arranged in a plurality of rows and columns, and may deliver the response signal outputted from the plurality of sensor pads 120 to the sensing circuit 140.

The sensing circuit 140 according to an embodiment is a circuit in which the output signal from the sensor pads 120 is inputted, and it delivers the corresponding output signal to the sensing signal adjusting unit 200. According to an embodiment, the sensing circuit 140 includes at least one amplifier and at least one impedance device, and may amplify and output the response signal based on the gain of the amplifier and the size of impedance.

The sensing circuit 140 may be included for one sensor pad 120 constituting the apparatus for detecting the fingerprint according to an embodiment. According to an embodiment, the output signal from the group of plurality of sensor pads 120 may be inputted to one sensing circuit 140.

The operation environment of each sensor pad 120 itself may vary depending on the location of the sensor pad 120 in the sensor array 130, the difference in design of the sensor pad 120 made by the design during process, and the difference in environment such as temperature and humidity. Accordingly, the response signal data outputted from the sensing circuit 140 includes the offset generated per sensor pad 120.

The sensing signal adjusting unit 200 may adaptively adjust the offset from the sensing signal outputted to adjust the level of the sensing signal.

According to an embodiment, the sensing signal adjusting unit 200 may detect the offset before the driving signal is applied, thereby adjusting the sensing signal with a method of subtracting the offset from the sensing signal according to the application of driving signal.

According to an embodiment, the sensing signal adjusting unit 200 may adjust the sensing signal with a method of raising or lowering the voltage level of sensing signal to the reference voltage level. The sensing signal adjusting unit 200 according to an embodiment may sample the data for the response signal (that is, the sensing signal) outputted from the sensing circuit 140 to maintain it, and include the sample and hold unit storing the value thereof. Additionally, the sensing signal adjusting unit 200 according to an embodiment of the present invention may further include one or both of Programmable Gain Amplifier (PGA) amplifying the sensing signal data with a fixed rate and Differential Signal Generator (DSG) converting the amplifying signal received from the PGA into a differential signal.

The Analog to Digital Converter (ADC) 300 may perform a function of digitalizing analogue sensing data. The data converted to have a digital form through the ADC 300 is stored in the memory of apparatus for detecting the fingerprint, and the apparatus for detecting the fingerprint may acquire fingerprint image through the corresponding data converted to have the digital form.

The apparatus for detecting the fingerprint according to an embodiment may include a driving device, and the driving device may include a fingerprint information processing unit, a memory, and a control unit, etc., and may be implemented by at least one integrated circuit (IC) chip.

The memory may store data converted to have the digital form through ADC 300, predetermined data used for detecting location of fingerprint, calculating dimension of fingerprint, distinguishing valley and ridge of fingerprint image, etc., or data received in real time.

The fingerprint information processing unit may calculate whether the fingerprint of the finger contacts the apparatus, the dimension of fingerprint in contact, and whether the valley and ridge of the fingerprint are distinguished, etc. through the voltage value in the form of digitalized data stored in the memory to generate necessary information.

The control unit may include a micro control unit (MCU), and may control the sensing signal adjusting unit 200, ADC 300, fingerprint information processing unit, memory, etc. to perform their own functions. Specifically, the control unit may control on/off, etc. of the switch included in the apparatus for detecting the fingerprint. The control unit may perform a determined signal processing through firmware.

Figure 3:
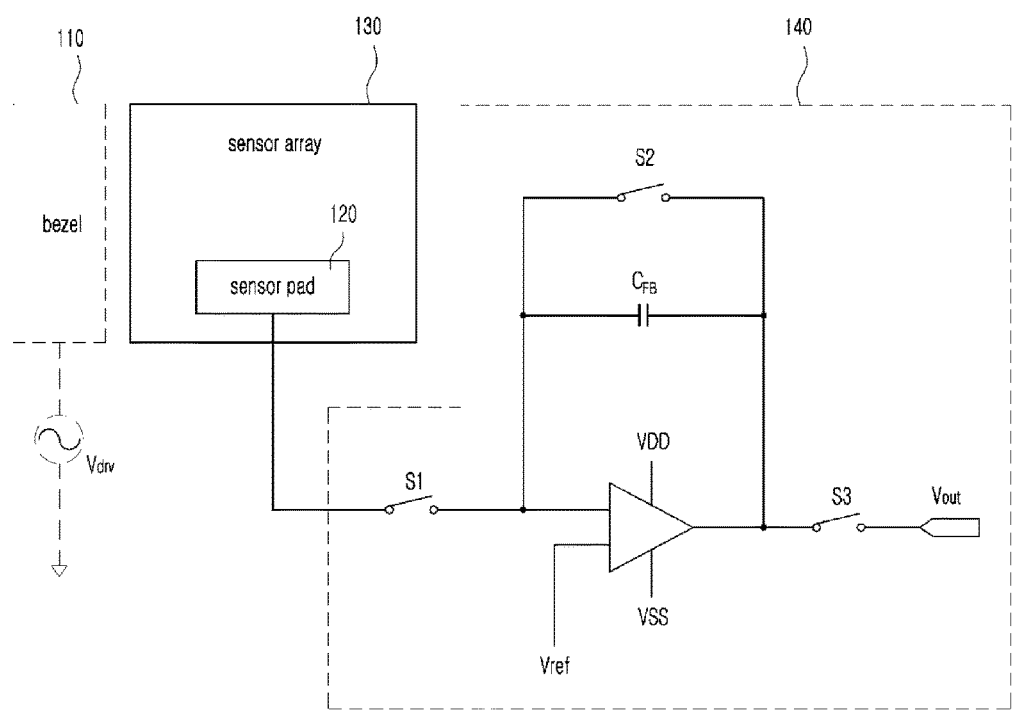
FIG. 3 is a view illustrating part of a structure of the apparatus for detecting the fingerprint according to an embodiment of the present invention.

FIG. 3 is a view illustrating part of a structure of the apparatus for detecting the fingerprint according to an embodiment of the present invention.

The apparatus for detecting the fingerprint illustrated in FIG. 3 operates in a capacitance manner, and includes a sensor array 130 including a plurality of sensor pads 120, and a sensing circuit 140.

In order to detect the change in capacitance according to the valley and ridge of the fingerprint in the apparatus for detecting the fingerprint, the driving signal $V_{drv}$ is applied to the finger, and the response signal from the finger is detected at the sensing circuit 140 through the sensor pad 120.

According to an embodiment, the driving signal $V_{drv}$ may be applied to the finger through an external electrode (for example, a driving electrode like bezel, etc. arranged around the apparatus for detecting the fingerprint). According to an embodiment, the driving signal $V_{drv}$ may be applied to the finger without an external electrode.

The sensing circuit 140 outputs different detecting signals by the difference in capacitance according to the distance of valley and ridge of the finger from the sensor pad.

$$V_{out} = V_{ref} - (C_{finger}/C_{FB}) \times V_{drv} \quad \text{[Equation 1]}$$

Equation 1 calculates the voltage size according to the valley and ridge of the fingerprint in the apparatus for detecting the fingerprint in FIG. 3.

Referring to Equation 1, $V_{out}$ means the output voltage, $V_{ref}$ means the reference voltage, and $C_{FB}$ means capacitance of the feedback capacitor. $V_{drv}$ is the driving signal, and $C_{finger}$ means capacitance formed when the finger contacts the sensor pad.

Figure 4:
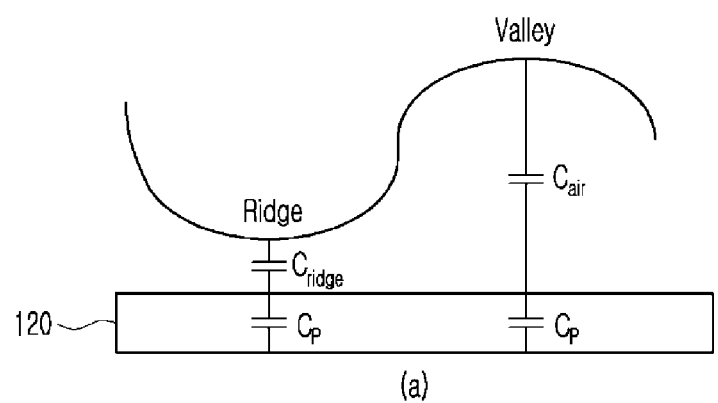
FIG. 4 is a view illustrating a response signal which varies depending on the offset generated per sensor pad according to an operation environment of the apparatus for detecting the fingerprint, according to an embodiment of the present invention.
Figure 4:
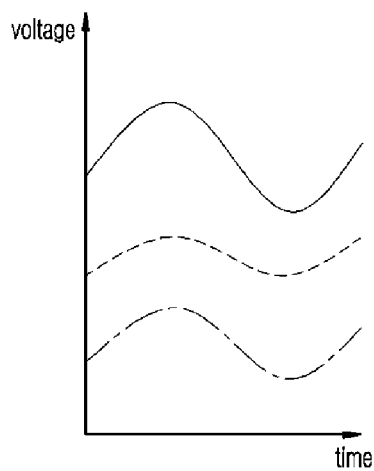

FIG. 4 is a view illustrating a response signal which varies depending on the offset generated per sensor pad 120 according to an operation environment of the apparatus for detecting the fingerprint, according to an embodiment of the present invention The parasitic capacitance $C_p$ in FIG. 4 means capacitance accompanied by the sensor pad 120, and is a sort of parasitic capacitance formed by the sensor pad 120, the signal wiring constituting the apparatus for detecting the fingerprint, protective layer between the sensor pad and finger, etc. The parasitic capacitance $C_p$ may include any parasitic capacitance generated by the sensor array 130 or peripheral part.

The air capacitance $C_{air}$ in FIG. 4 is capacitance formed between the valley of the fingerprint and sensor pad 120. The capacitance increases as the distance becomes shorter. Thus, as the distance between the valley of the fingerprint and sensor pad 120 increases, the air capacitance $C_{air}$ decreases.

It is assumed that FIG. 4(a) is a situation of average fingerprint recognition. According to this, it is general that the sum of capacitance $C_{ridge}$ formed between the ridge of the fingerprint and sensor pad 120 and parasitic capacitance $C_p$ is greater than the sum of air capacitance $C_{air}$ formed between the valley of the finger and sensor pad 120 and parasitic capacitance $C_p$.

In Equation 1, $C_{finger}$ indicates capacitance formed when the finger contacts the sensor pad 120, which is divided into $C_{finger\_ridge}$ and $C_{finger\_valley}$ values depending on which part of the valley and ridge of the finger is contacted. In Equation 1, the output voltage, $V_{out}$ may become different output values such as $V_{ridge}$ and $V_{valley}$ according to which of $C_{finger\_ridge}$ and $C_{finger\_valley}$ values is applied to $C_{finger}$.

That is, the apparatus for detecting the fingerprint may distinguish the difference between the valley contacting the sensor pad 120 and the ridge contacting the sensor pad 120, through the difference in $V_{ridge}$ and $V_{valley}$ values.

Meanwhile, the difference between the capacitance formed between the ridge of the fingerprint and sensor pad 120, and the capacitance formed between the valley of the fingerprint and sensor pad 120 may vary depending on the change in the state of fingerprint, operation situation of the apparatus for detecting the fingerprint, external environment or environment of each sensor pad 120 (for example, the location of sensor pad, and the difference between the sensor pads generated by the design during process), etc.

Even if the difference between the capacitance formed between the ridge of the fingerprint and sensor pad 120, and the capacitance formed between the valley of the fingerprint and sensor pad 120 is the same, the average level of both voltage values may differ from each other.

For example, although the difference between $V_{ridge}$ and $V_{valley}$ is maintained to be 0.2V, in some cases, each value may be 1.0V and 0.8V (the average level is 0.9V), and in other cases, each value may be maintained to be 0.6V and 0.4V (the average level is 0.5V), so that the difference between the values may be maintained to be 0.2V. Thus, part of the fingerprint image acquired from the apparatus for detecting the fingerprint according to the offset may be dark or blurred. That is, according to the operation environment or design process of sensor array 130, the sensor pad 120 itself may change (pixel variation), resulting in change in offset of the response signal. As a result, even though the same finger contacts the sensor array, the quality of fingerprint image outputted may not be uniform.

That is, as illustrated in FIG. 4(b), the voltage level and offset level acquired by each sensor pad 120 may also differ depending on the difference in internal design of the apparatus for detecting the fingerprint, or the change (pixel variation) according to the operation environment of each sensor pad 120 itself. When subtracting or amplifying the fingerprint image where the voltage level of the output signal is not constant as data, the noise may not be efficiently canceled and the quality of fingerprint image may be worse.

Accordingly, according to the change in capacitance between the fingerprint and sensor pad 120, in order for the apparatus for detecting the fingerprint in different operation environments to fix the voltage level acquired from each sensor pad 120 in the sensor array 130, a sensing signal adjusting unit 200, which cancels the offset of voltage level acquired from the sensor pad 120 based on the reference voltage is necessary.

Hereinafter, with reference to FIGS. 5, 6 and 7, according to an embodiment of the present invention, a method for adjusting the sensing signal will be explained, where the sensing signal adjusting unit 200 detects the offset before the application of driving signal to subtract the offset from the sensing signal when the driving signal is applied.

In this case, the sample and hold unit 210, which is a constitutional element of the sensing signal adjusting unit 200, includes a data sample and hold unit 211 and an offset sample and hold unit connected in parallel, and may further include PGA 230 as another constitutional element of the sensing signal adjusting unit 200.

Figure 5:
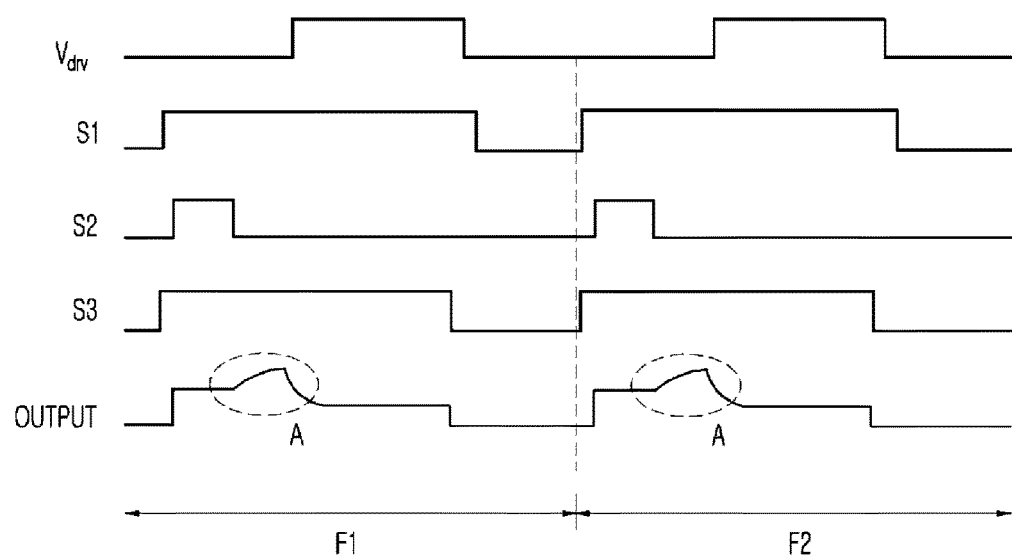
FIG. 5 is a timing diagram illustrating the driving signal of the apparatus for detecting the fingerprint in FIG. 3, and the signal detected from the sensing circuit according to the operation of switches in the sensing circuit.

FIG. 5 is a timing diagram illustrating the driving signal of the apparatus for detecting the fingerprint in FIG. 3, and the signal detected from the sensing circuit 140 according to the operation of switches in the sensing circuit 140.

In FIG. 5, the term "high" used for each switch S1, S2 and S3 means that the switches are in an on state, whereas the term "low" means that the switches are in an off state. Additionally, when the driving signal $V_{drv}$ is described as being high, this means that the driving signal $V_{drv}$ is applied, and when the driving signal is described as being low, this means that driving signal $V_{drv}$ is not applied. According to an embodiment, the driving signal $V_{drv}$ may be a pulse signal controlled by a clock signal, and may be implemented in various ways such as an AC voltage or a DC voltage, etc. having a predetermined frequency.

Referring to FIG. 5, S1 indicates an input switch connecting the sensing circuit 140 from the sensor pad 120, S2 indicates a feedback switch connected to both ends of the feedback capacitor $C_{FB}$, and S3 indicates an output switch delivering the detecting signal (or output signal, OUTPUT), which is an output of the sensing circuit 140, to the sample and hold unit at the back.

At least one driving signal $V_{drv}$ may be applied per frame in the apparatus for detecting the fingerprint. The specification of the present invention includes the term "frame" which is a time unit where a finger print is detected for all sensor pads 120 included in the sensor array 130.

Referring to FIG. 5, the operation of switches for two frames F1 and F2, the driving signal $V_{drv}$, and output signal OUTPUT detected accordingly from the sensing circuit 140 are shown.

Referring to the operation of input switch S1, the input switch is turned on upon the starting of the frame, and maintains its on state until the application of the driving signal $V_{drv}$ is started and is terminated. When the input switch S1 is turned off, the response signal from the sensor pad 120 cannot be delivered to the back end of the sensing circuit 140, and thus the input switch S1 may be mostly maintained in an on state in one frame.

The feedback switch S2 is turned on before the driving signal $V_{drv}$ is applied, and likewise, it is turned off before the driving signal $V_{drv}$ is applied. While the feedback switch S2 is maintained to be in an on state, both ends of feedback capacitor $C_{FB}$ may have the same potential. In order for the feedback capacitor $C_{FB}$ to perform such role, the feedback switch S2 needs to be turned off. That is, the feedback switch S2 makes the potential difference at both ends of the feedback capacitor $C_{FB}$ to be 0 when each frame is started, thereby making the amount of charge charged in the feedback capacitor $C_{FB}$ to be 0 to reset the sensing circuit 140.

The output switch S3 is converted to be in an on state upon the starting of frame, like the input switch S1. Meanwhile, unlike the input switch S1, the output switch S3 is turned off before the application of driving signal $V_{drv}$ is terminated, which shows that the change in output signal OUTPUT according to the application of driving signal $V_{drv}$ is sufficiently applied to the sample and hold unit, etc. connected to the output end of the sensing circuit 140, and then the output switch S3 is turned off before the application of driving signal $V_{drv}$ is terminated. This is because when the application of driving signal $V_{drv}$ is terminated, the undesired offset, noise, etc. could be delivered to the output end of the sending circuit 140.

In the apparatus for detecting the fingerprint in FIG. 3, even if the driving signal $V_{drv}$ has not been applied yet, the response signal from the sensor pad 120 may be detected from the sensing circuit 140. Ideally, after the feedback switch S2 is turned off, the output signal OUTPUT detected from the sensing circuit 140 needs to maintain a constant value until the driving signal $V_{drv}$ is applied. According to any offset generated per sensor pad 120, the output signal OUTPUT may be changed like A area in FIG. 5. The offset shown in A area is an exemplary wave form, so the offset may increase in the reference voltage value before the offset is reflected, or may decrease. Also, offsets with various wave forms may be detected.

The offset generated in each sensor pad 120 may vary depending on the operation situation of the apparatus for detecting the fingerprint, the difference in structure of the sensor pad 120 generated by the design during process, the location where each sensor pad 120 is arranged in the apparatus for detecting the fingerprint, etc.

As the response signal according to the driving signal includes the offset differently generated between the sensor pads 120, the voltage value outputted according to the valley and ridge of the fingerprint may not be constant per sensor pad 120, and as a result thereof, the quality of fingerprint image may be deteriorated.

Figure 6:
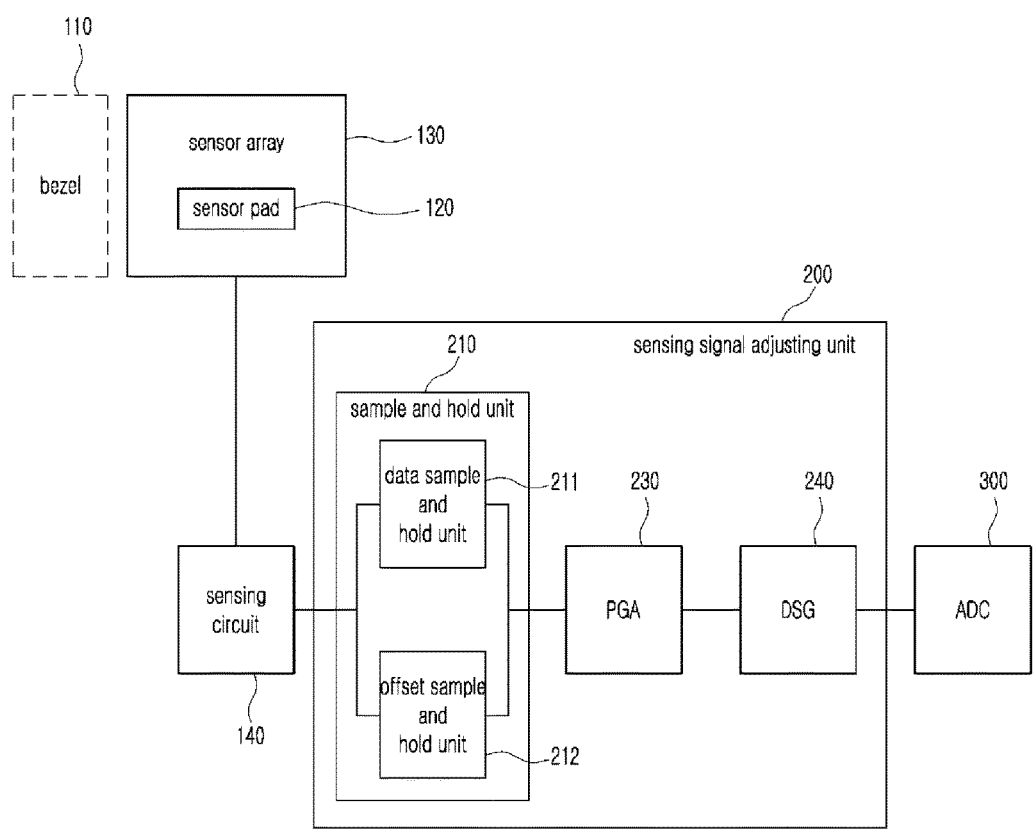
FIG. 6 is a block diagram schematically illustrating a constitution of the apparatus for detecting the fingerprint performing offset adjustment through the data sample and hold unit and offset sample and hold unit, according to an embodiment of the present invention.

FIG. 6 is a block diagram schematically illustrating a constitution of the apparatus for detecting the fingerprint performing offset adjustment through the data sample and hold unit and offset sample and hold unit, according to an embodiment of the present invention.

Referring to FIG. 6, the apparatus for detecting the fingerprint performing offset adjustment according to an embodiment of the present invention may include a sensor pad 120, a sensor array 130, a sensing circuit 140, a sensing signal adjusting unit 200, and an ADC 300. The sensing signal adjusting unit 200 may include a data sample and hold unit 211, an offset sample and hold unit 212, a PGA 230, and a DSG 240.

According to an embodiment of the present invention, at least one of PGA 230 and DSG 240 may be omitted. In this case, the apparatus for detecting the fingerprint may include an additional bezel 110 for applying the driving voltage according to an embodiment, and may apply the driving voltage to the finger without an additional bezel 110 according to an embodiment. The sensing circuit 140 in the apparatus for detecting the fingerprint illustrated in FIG. 6 is a circuit detecting the output signal from the sensor pads 120, which delivers the detecting signal to the data sample and hold unit 211 and offset sample and hold unit 212. The sensing circuit 140 may include a feedback switch S2 connecting both ends of the feedback capacitor $C_{FB}$ and feedback capacitor, an input switch S1 connecting the first input end of the operation amplifier and the sensor pads 120, an output switch S3 connecting the output end of the operation amplifier and sample and hold units 210, etc.

According to an embodiment, the detecting signal outputted from the sensing circuit 140 may be applied to the data sample and hold unit 211 and offset sample and hold unit 212, respectively.

According to an embodiment, the data sample and hold unit 211 of the present invention samples the detecting signal outputted from the sensing circuit 140 to maintain it, and stores the value thereof. Like the conventional apparatus for detecting the fingerprint, as the driving signal $V_{drv}$ is applied, the output signal outputted from the sensing circuit 140 may be sampled for a certain time. Thus, the response signal sampled and stored by the data sample and hold unit 211 may include the offset differently generated per sensor pad 120.

According to an embodiment, the offset sample and hold unit 212 detects the offset of detecting signal outputted from the sensing circuit 140 before the driving signal $V_{drv}$ is applied to maintain its value and store it. As illustrated in FIGS. 3 and 5, the feedback switch S2 among the features of sensing circuit 140 is converted from an on state to an off state, and the offset is generated before the driving signal $V_{drv}$ is applied. The offset sample and hold unit 212 may detect this offset and store it.

That is, the data sample and hold unit 211 and offset sample and hold unit 212 may have different timings operated in one frame. When the data sample and hold unit 211 operates after the driving signal $V_{drv}$ is applied, the offset sample and hold unit 212 may operate before the driving signal $V_{drv}$ is applied.

Upon reviewing the reason why the offset sample and hold unit 212 and the data sample and hold unit 211 operate at different timings, when the offset sample and hold unit 212 operates after the driving signal $V_{drv}$ is applied like the data sample and hold unit 211, due to the operation of the offset sample and hold unit 212, the data value acquired by the data sample and hold unit 211 may be changed.

Additionally, when the offset sample and hold unit 212 operates after the driving signal $V_{drv}$ is applied like the data sample and hold unit 211, the offset is included in the response signal from the sensor pads 120. Accordingly, the offset sample and hold unit 212 would sample the signal to which the response signal and offset signal are synthesized, and accordingly, there would be difficulty in detecting the offset signal only.

Like the embodiment above, as the offset sample and hold unit 212 operates before the driving signal $V_{drv}$ is applied, the offset may be detected more easily. Specifically, when the feedback switch S2 of the sensing circuit 140 is converted from an on state to an off state, as stated above, ideally, a constant voltage value needs to be outputted as the output end. The offset sample and hold unit 212 compares the output signal generated before the feedback switch S2 is turned off and the driving signal $V_{drv}$ is applied with an ideal voltage value which does not exist in the offset, to detect the offset only included in the output signal.

Meanwhile, the sampling period of the data sample and hold unit 211 and offset sample and hold unit 212 may be controlled by a certain clock signal.

According to an embodiment, the sampling period may be controlled so that the offset sample and hold unit 212 could sample each sensor pad 120 once during one frame. The sample and hold unit generally includes a capacitor. As the signal is applied to the capacitor, the charge is accumulated, and accordingly the output of the sample and hold unit may be determined based on the amount of accumulated charge. Thus, a total amount of offset may be sampled by controlling the sample period so that the offset sample and hold unit 212 could perform one sampling during a time interval when the offset is detected.

The PGA 230 performs a function of amplifying the sensed data. Another output data is generated according to whether the ridge or valley of the fingerprint contacts each sensor pad 120 constituting the apparatus for detecting the fingerprint. PGA controls its gain by raising or lowering the gain to make the difference in output data with different sizes bigger.

The PGA 230 according to an embodiment may include a data input unit and an offset input unit. The offset may be received from the offset sample and hold unit 212 through the offset input unit, and the data for detecting signal of the sensing circuit 140 according to the application of driving signal $V_{drv}$ may be received from the data sample and hold unit 211 through the data input unit. Afterwards, when amplifying the data received from the data sample and hold unit 211, the PGA 230 subtracts the offset received from the offset sample and hold unit 212 and then amplifies it. That is, the PGA 230 subtracts the second sampling signal received from the offset sample and hold unit 212 from the first sampling signal received from the data sample and hold unit 211, thereby canceling the offset from the detecting signal outputted from the sensing circuit 140 according to the application of driving signal.

When receiving the offset and data signal from the offset sample and hold unit 212 and data sample and hold unit 211, the PGA 230 does not receive them at the same time, but receives them with a certain time interval. Specifically, the PGA 230 receives the first sampling signal from the offset sample and hold unit 212 at a first period, and receives the second sampling signal from the data sample and hold unit 211 at a second period, which is temporally separated from the first period. The reason why the PGA 230 receives two types of signals with a certain time interval is to cancel the offset generated arbitrarily according to the characteristics of each sensor pad 120.

The DSG 240 performs a function of converting the amplified signal received from PGA 230 into a differential signal. The differential signal means a signal with a pair of inverted shapes. When one signal has a positive voltage, another signal will have a negative voltage with the same size. Even if noise occurs, this may affect a pair of differential signals at the same time, so the difference between the differential signals may be maintained as it is. Thus, the advantage of using this differential signal is that the signal has tolerance to the noise, the possibility of the occurrence of errors relevant to the signal timing is low, and the signal is not much affected by the interference due to neighboring different signal wirings.

Meanwhile, the sensing signal adjusting unit 200 in the apparatus for detecting the fingerprint may not include at least one of the PGA 230 and DSG 240. In this case, the signal without the offset is directly sent from the sample and hold unit 210 to the ADC 300. FIG. 7 is a timing diagram illustrating an operation of the apparatus for detecting the fingerprint performing offset adjustment through the data sample and hold unit 211 and offset sample and hold unit 212, according to an embodiment of the present invention.

Figure 7:
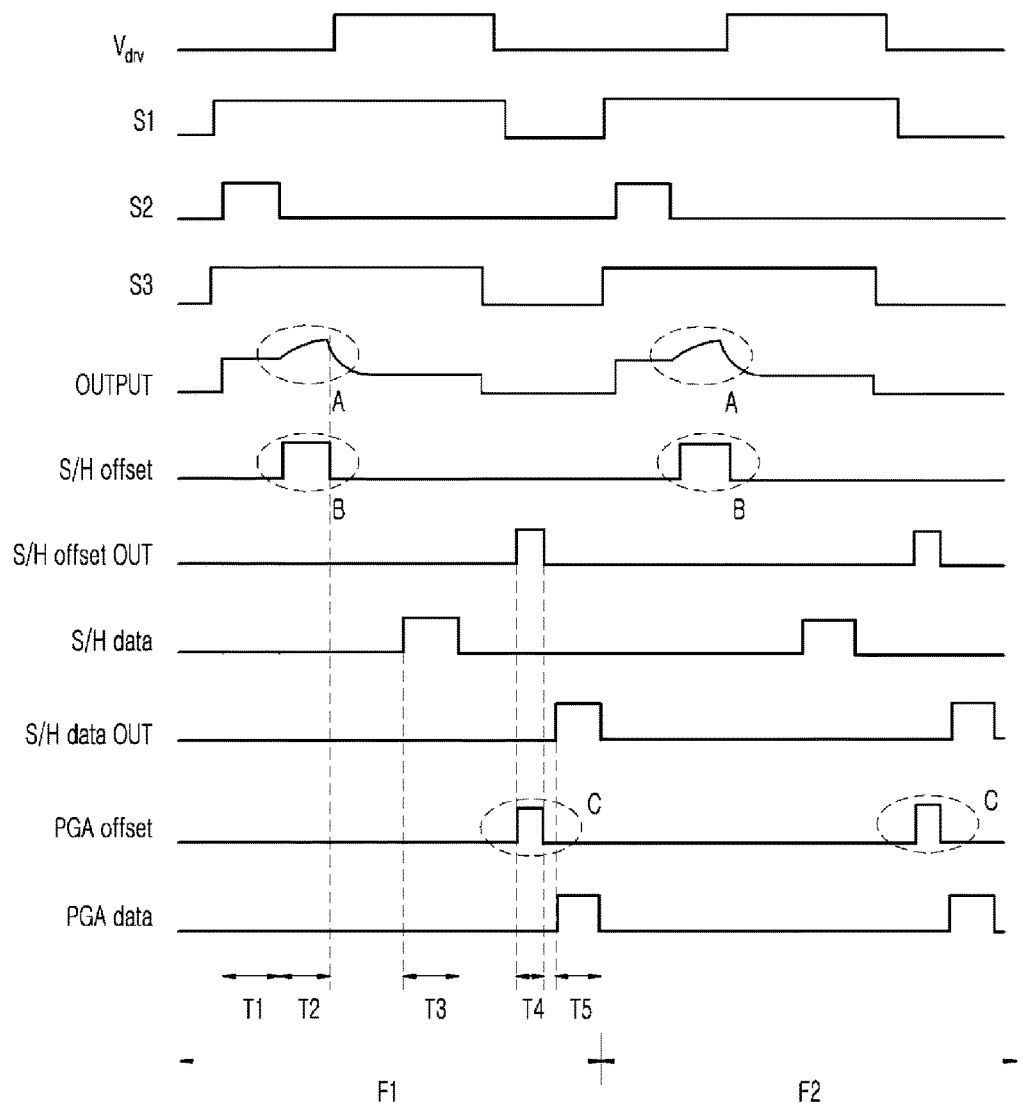
FIG. 7 is a timing diagram illustrating an operation of the apparatus for detecting the fingerprint performing offset adjustment through the data sample and hold unit and offset sample and hold unit, according to an embodiment of the present invention.

FIG. 7 illustrates the application timing of driving signal $V_{drv}$, the on/off timing of input switch S1, the feedback switch S2, the output switch S3, etc., and the change in output signal OUTPUT detected from the output end of the sensing circuit 140.

The S/H offset in FIG. 7 represents an enable signal applied to the offset sample and hold unit 212, and S/H offset OUT represents a signal which the data sample and hold unit 212 maintains and then outputs. The PGA offset represents a signal received by the PGA 230 from the offset sample and hold unit 212, and PGA data represents a signal received by the PGA 230 from the data sample and hold unit 211.

Hereinafter, with reference to FIG. 7, a process will be explained in which a driving signal $V_{drv}$ is applied in one frame, and accordingly, a response signal detected from the sensor pad 120 passes a sensing circuit 140 including an amplifier, feedback capacitor and a plurality of switches, and is amplified in PGA 230 through the data sample and hold unit 211 and offset sample and hold unit 212. FIG. 7 illustrates the timing for two frames F1 and F2, but their operations overlap with each other. Thus, for the sake of convenience, only the first frame F1 will be explained.

In FIG. 7, the application of driving signal $V_{drv}$, the operation of input switch S1, the feedback switch S2 and the output switch S3, and the change in output signal OUTPUT according thereto are the same as those explained in FIG. 5 with reference to FIG. 3.

As stated above, the feedback switch S2 is maintained to be in an on state in T1 period. By the operation of fingerprint detection performed before the corresponding frame F1, the feedback capacitor $C_{FB}$, etc. storing the charge may be reset. In T1 period, the input switch S1 and output switch S3 are maintained to be in an on state, and the output signal OUTPUT detected from the sensor pad 120 is maintained at a constant value.

When the feedback switch S2 is turned off, T2 period is started. T2 period is a period before the driving signal $V_{drv}$ is applied. However, as the feedback switch S2 is converted from the on state to the off state, the output signal OUTPUT may include any offset generated in the sensor pad 120 like A area.

In T2, the enable signal is applied to the offset sample and hold unit 212 like B area, and accordingly, the offset sample and hold unit 212 detects the offset included in the output signal OUTPUT. In an ideal case where the offset is not generated, the offset sample and hold unit 212 stores the voltage value to be detected in T2 period, and subtracts this from the data value sampled, thereby detecting the offset only generated due to the characteristics of each sensor pad 120.

As illustrated in the A area of T2 period, the offset generated in the sensor pad 120 may not have a constant square wave form. According to an embodiment, in this case, one period of sampling of the offset sample and hold unit 212 may be controlled with a time interval of T2 period. Additionally, the signals of the offset that is not constant may be added up, and the sum thereof may be sampled and then outputted.

The offset sample and hold unit 212 performs sampling in T2 period in one frame F1 until the driving signal $V_{drv}$ is applied, after the feedback switch S2 is turned off. The offset sample and hold unit may output the value which is maintained and stored through sampling in T4, a point when the application of driving signal $V_{drv}$ is terminated so that PGA 230 could receive this. That is, the operation of detecting offset by the offset sample and hold unit 212 may be performed after the feedback capacitor becomes reset as the feedback switch S2, which was maintained to be in an on state, becomes turned off. The offset data received by PGA 230 may be the same as that illustrated in C area, and this is a sampling value by the offset sample and hold unit 212 in T2 period.

Upon reviewing the operation in T3 period, in this period, the driving signal $V_{drv}$ is applied, and the response signal from the sensor pads 120 passes through the sensing circuit 140 and is detected as the output signal OUTPUT of the output end. In FIG. 7, although not illustrated in the wave form of output signal OUTPUT in T3 period, the output signal OUTPUT determines whether the fingerprint is contacted and includes the offset generated in the sensor pad 120. Thus, the output signal may be detected in various shapes.

Upon reviewing S/H data in T3 period, the data sample and hold unit 211 may receive the application of enable signal in this period, and perform sampling for the output signal OUTPUT detected at the sensing circuit 140 according to the application of driving signal $V_{drv}$. Afterwards, the data sample and hold unit 211 may output the value maintained and stored through the sampling in T5 period when the application of driving signal $V_{drv}$ is terminated, and then deliver the value to PGA 230.

The data sampled and outputted by the data sample and hold unit 211 may include the offset. Only when the offset outputted by the offset sample and hold unit 212 is canceled from this data, the data without offset which is generated arbitrarily according to the characteristics of each sensor pad 120 may be acquired.

Upon reviewing the operation in T4 period and T5 period, as the application of driving signal $V_{drv}$ is terminated, and the input switch S1 and output switch S3 are turned off, the output signal OUTPUT is not detected.

In this period, PGA 230 may subtract the offset received from the offset sample and hold unit 212 from the data for response signal received from the data sample and hold unit 211, and amplify the remaining data signal.

Specifically, PGA 230 may receive the offset outputted from the offset sample and hold unit 212 through the offset input unit in T4 period, and receive data signal outputted from the data sample and hold unit 211 through the data input unit in T5 period.

Referring to FIG. 7, the S/H offset OUT signal is consistent with PGA offset signal in T4 period. This is because the output of the offset sample and hold unit 212 is immediately inputted to PGA 230. Likewise, the S/H data OUT signal is consistent with PGA data signal in T5 period.

According to an embodiment, as illustrated in FIG. 7, PGA 230 may receive the offset first, and receive the data for response signal later to cancel the offset from the data of response signal, and amplify the data without offset.

The data whose offset is adjusted and amplified by PGA 230 is converted into digital signal through the ADC 300, and the apparatus for detecting the fingerprint may combine the converted digital signals to acquire fingerprint image. The fingerprint image acquired may be an image with a constant quality which is less affected by any offset generated according to the operation environment of each sensor pad 120, the difference in structure made by process, the location of each sensor pad 120 in the sensor array 130, etc.

Hereinafter, with reference to FIGS. 8, 9 and 10, according to an embodiment of the present invention, a method for canceling the offset by adjusting the average voltage level of sensing signal based on the reference voltage, having the offset canceling unit 250 included as one constitutional element of sensing signal adjusting unit 200 will be explained.

Figure 8:
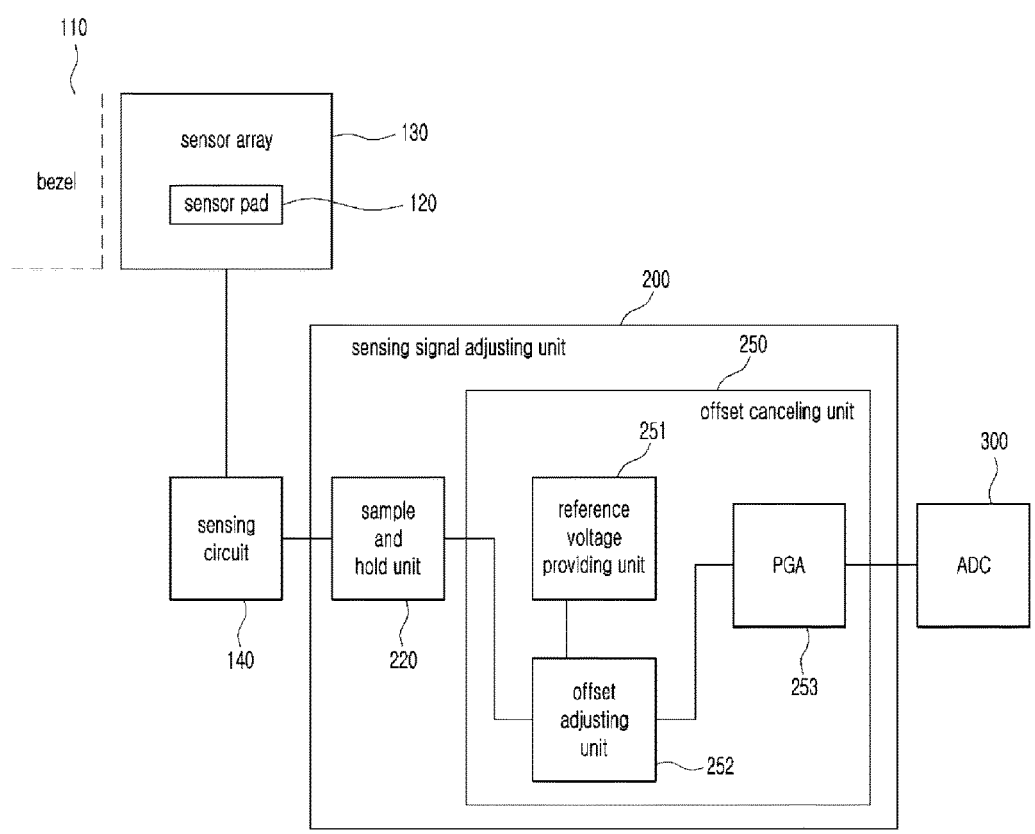
FIG. 8 is a block diagram schematically illustrating a constitution of the apparatus for detecting the fingerprint performing offset adjustment through the offset canceling unit according to an embodiment of the present invention.

FIG. 8 is a block diagram schematically illustrating a constitution of the apparatus for detecting the fingerprint performing offset adjustment through the offset canceling unit 250 according to an embodiment of the present invention.

The apparatus for detecting the fingerprint according to an embodiment illustrated in FIG. 8 includes a sensor pad 120, a sensor array 130, a sensing circuit 140, a sensing signal adjusting unit 200 and an ADC 300. The sensing signal adjusting unit 200 may include a sample and hold unit 220 and an offset canceling unit 250.

The sample and hold unit 220 samples data for response signal outputted from the sensing circuit 140 and maintains the data, and stores the value thereof. The sampling period of the sample and hold unit 220 is controlled by a certain clock signal.

The offset canceling unit 250 plays a role of adjusting the offset for output data of sample and hold unit 220. Specifically, the offset canceling unit 250 may include a reference voltage providing unit 251 providing a certain level of reference voltage, and an offset adjusting unit 252 adjusting the average voltage level of response signal acquired from the sample and hold unit 220 to the reference voltage level provided by the reference voltage providing unit 251.

The reference voltage providing unit 251 adjusts the voltage inputted from a voltage supplying circuit in the apparatus for detecting the fingerprint to a certain level, and provides the reference voltage so that the offset could be canceled.

For example, assuming that the voltage supplying circuit in the apparatus for detecting the fingerprint provides 5V to the offset canceling unit 250, the voltage of 5V inputted may be changed to 4.8V or 5.1V, depending on the operation state, external environment, etc. of the apparatus for detecting the fingerprint. In this case, when the reference voltage provided by the reference voltage providing unit 251 is 5V, and the average voltage level of response signal acquired from the sample and hold unit 220 is greater than the reference voltage, the offset adjusting unit 252 may lower this. When the average voltage level of response signal is lower than the reference voltage, the offset adjusting unit 252 may raise this. The performance of negative feedback of the offset adjusting unit 252 for stabilizing the average voltage level of response signal is made based on the reference voltage provided by the reference voltage providing unit 251.

The offset canceling unit 250 cancels the offset included in the unstable average voltage level change of response signal shown depending on the operation state of the apparatus for detecting the fingerprint based on the reference voltage, thereby improving the quality of fingerprint image acquired from the apparatus for detecting the fingerprint.

The offset adjusting unit 252 may adjust the average voltage level of response signal from each sensor pad 120, based on the reference voltage provided by the reference voltage providing unit 251.

While the same finger contacts the apparatus for detecting the fingerprint, the signal average voltage level of response signal outputted from each sensor pad 120 may be continuously changed by the sensor pad 120, sensor array 130, sensing circuit 140, etc.

The operation environment of each sensor pad 120 itself may vary depending on the location of sensor pad 120 in the sensor array 130, the difference in the design of sensor pad 120 made by the design during process, and the difference in environment like temperature and humidity. Accordingly, the offset of response signal outputted from each sensor pad 120 may become different, and the offset may not be constant even in one sensor pad 120 according to the flow of time.

The offset adjusting unit 252 may adjust the offset generated with the above reason in real time, and adjust the average voltage level of response signal of each sensor pad 120 to the reference voltage to cancel the offset.

As stated above, due to the operation of offset canceling unit 250, when the same fingerprint contacts the apparatus for detecting the fingerprint, the offset generated according to the operation of sensor pad 120 itself may be canceled, and the change in the offset generated due to different characteristics of finger per person, external environment, etc. may also be canceled.

In the output end of offset canceling unit 250 according to an embodiment of the present invention, the amplifier is added to amplify the output voltage without offset from the reference voltage. The amplifier may correspond to PGA 253, and in this case, PGA 253 may be included in the offset canceling unit 250.

Figure 9:
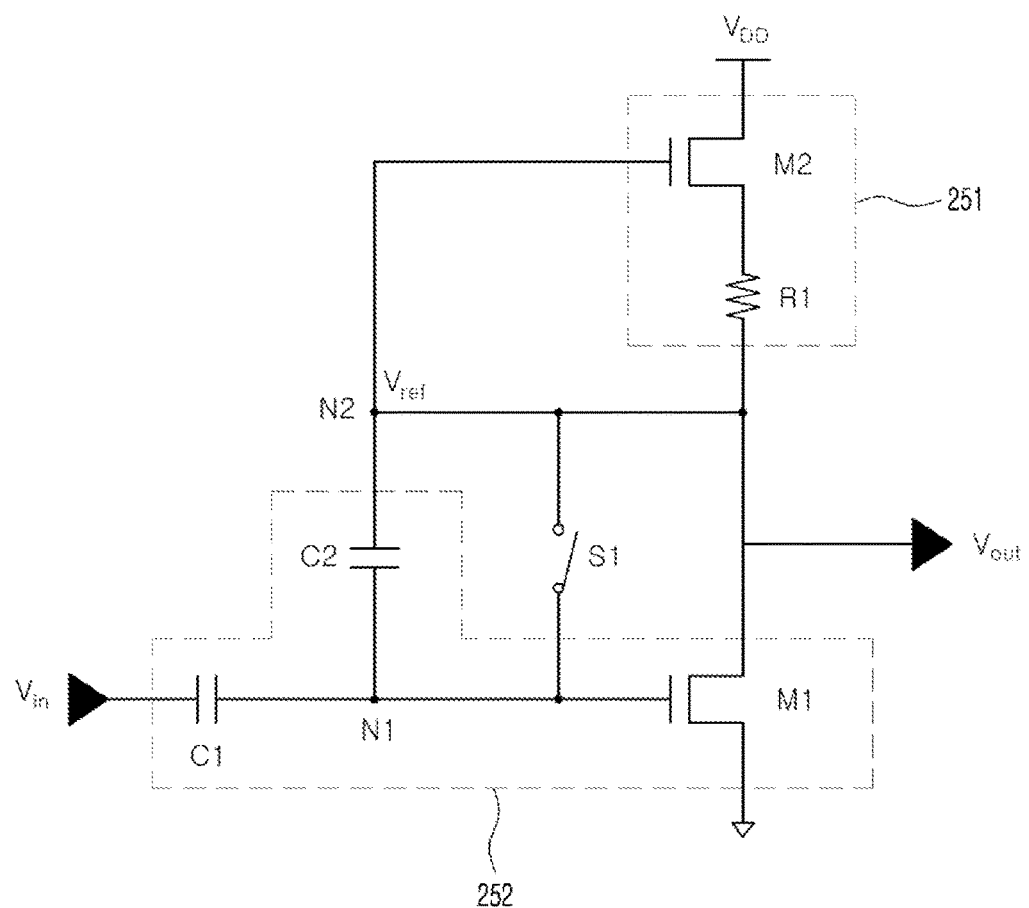
FIG. 9 is a view illustrating a shape of the offset canceling unit according to an embodiment of the present invention.

FIG. 9 is a view illustrating a shape of the offset canceling unit 250 according to an embodiment of the present invention.

Referring to FIG. 9, the offset canceling unit 250 may include a reference voltage providing unit 251 and an offset adjusting unit 252.

According to an embodiment, the reference voltage providing unit 251 may include a second transistor M2 and resistance R1, and the offset adjusting unit 252 may include a first transistor M1, and first and second capacitors C1 and C2.

The first and second transistors M1 and M2 of the present invention may include a gate, a source, a drain electrode as field effect transistor.

Upon reviewing the arrangement of offset canceling unit 250, the input voltage $V_{DD}$ may be applied to the drain electrode of the second transistor M2 in the reference voltage providing unit 251, and the input voltage $V_{DD}$ may be controlled by the control unit of the apparatus for detecting the fingerprint. Resistance R1 may be connected to the source electrode of the second transistor M2, and the other side of resistance may be connected to the second node N2 (reference voltage node) along with gate electrode of the second transistor M2.

The drain electrode of the first transistor M1 in the offset adjusting unit 252 is connected to the second node N2 (reference voltage node). The second node N2 (reference voltage node) is maintained as the reference voltage $V_{ref}$ provided by the reference voltage providing unit 251, and is changed according to the input value $V_{in}$ of the offset canceling unit 250 to have the output value $V_{out}$ of offset canceling unit 250. The source electrode of the first transistor M1 is connected to the ground voltage, and the gate electrode may be connected to the first node N1 (response signal input node) so that it could be connected to the first and second capacitors C1 and D2.

In the apparatus for detecting the fingerprint according to an embodiment of the present invention, the response signal from the sample and hold unit 220 may become the input value $V_{in}$ of offset canceling unit 250, and may be inputted to the first node N1 (response signal input node) through the first capacitor C1.

The second capacitor C2 may connect the first node N1 (response signal input node) entered through the first capacitor C1, and the second node N2 (reference voltage node) in which the output value $V_{out}$, which is a final output of offset canceling unit 250, is formed.

Hereinafter, the reference voltage providing unit 251 and offset adjusting unit 252 forming the offset canceling unit 250 will be explained.

The second transistor M2 in the reference voltage providing unit 251 plays a role of constantly maintaining the reference voltage $V_{ref}$ in which the input voltage $V_{DD}$ entered from the drain electrode is formed through the second transistor M2 and resistance R1. For example, if the reference voltage $V_{ref}$ decreases, the gate voltage of the second transistor M2 also decreases. As the drain current decreases, the descent amount of voltage in resistance R1 decreases. Accordingly, the reference voltage $V_{ref}$ may increase and is maintained.

On the contrary, when the reference voltage $V_{ref}$ increases, the gate voltage of second transistor M2 also increases, and accordingly, the drain current increases. Additionally, as the descent amount of voltage in resistance R1 increases, the reference voltage $V_{ref}$ may also decrease.

As the second transistor M2 in the reference voltage providing unit 251 operates together with variable resistance, this may prevent the reference voltage $V_{ref}$ from being changed according to the operation environment of apparatus for detecting the fingerprint and the difference in each sensor pad 120 itself.

The offset adjusting unit 252 according to an embodiment includes a first transistor M1, and first and second capacitors C1 and C2. The offset adjusting unit 252 allows the input value $V_{in}$ of the offset canceling unit 250 to be in the reference voltage $V_{ref}$ level value provided by the reference voltage providing unit 251, thereby adjusting the offset of output voltage $V_{out}$.

For example, regarding the operation of offset adjusting unit 252, the first and second nodes N1 and N2 (response signal input node and reference voltage node) before the offset canceling unit 250 performs an initial operation may be set to the same potential. As the first and second nodes N1 and N2 (response signal input node and reference voltage node) have the same potential, the amount of charge charged may not exist in the second capacitor C2.

According to an embodiment, in order for the first and second nodes N1 and N2 (response signal input node and reference voltage node) to have the same potential, a switch like S1 in the drawings should exist. The switch may be turned off before performing the initial operation of the offset canceling unit 250, and may be turned on when the offset canceling unit 250 operates. The switch S1 may be turned on/off by the control unit in the apparatus for detecting the fingerprint.

In such state, when the input value $V_{in}$ of the offset canceling unit 250 is applied, the amount of charge charged in the first and second capacitors C1 and C2 may vary according to the difference between the input value $V_{in}$ and reference voltage $V_{ref}$, and the first transistor M1 may output the voltage value allowing the amount of input value $V_{in}$ to be changed with the reference voltage $V_{ref}$ as the average value.

Specifically, a charge is charged to the capacitor C1 by the difference between the input value $V_{in}$ applied to the offset canceling unit 250 from the sample and hold unit 220 and the reference voltage $V_{ref}$ which is the initial voltage of first node N1 (response signal input node). Accordingly, the voltage of the first node N1 (response signal input node) may be changed. Since the first node N1 (response signal input node) is connected to the gate electrode of the first transistor M1, as the voltage of gate electrode in the first transistor M1 varies, the current value of drain electrode also varies. Accordingly, the voltage $V_{ref}$ of the second node N2 (reference voltage node) may be changed, and thus the changed voltage value may be the output value $V_{out}$ of offset canceling unit 250. Meanwhile, the reference voltage providing unit 251 including the second transistor M2 and resistance R1 tends to maintain a constant voltage in the second node N2 (reference voltage node). Thus, only the change in input value $V_{in}$ may be reflected into the second node N2 (reference voltage node), and accordingly, the difference between the input value $V_{in}$ and reference voltage $V_{ref}$, that is, the offset of output voltage $V_{out}$ would be canceled.

The output value $V_{out}$ outputted is delivered from the offset canceling unit 250 to the ADC 300, converted into the digital data in the ADC 300, and may be used for acquiring fingerprint image.

By means of the offset canceling unit 250, the quality of fingerprint image acquired in the apparatus for detecting the fingerprint may be improved. Specifically, as the average level of input value $V_{in}$ of offset canceling unit 250 is adjusted to the reference voltage $V_{ref}$, the quality of fingerprint image acquired may be improved.

It is ideal for each sensor pad 120 in the apparatus for detecting the fingerprint to be produced with the same specification to show the same performance. However, the offset may be generated in the output signal of sensor pad according to the location of sensor pad 120 in the sensor array 130, difference made during the process of manufacturing sensor pad 120, operation situation of the apparatus for detecting the fingerprint, external environment, etc. When this offset is not canceled, even in one fingerprint image, the quality of fingerprint image may be decreased such that some parts are blurred, and some parts are dark. When the output is amplified while the offset is not canceled, the noise will not be efficiently canceled. Thus, the noise image irrelevant to the fingerprint may be included in the fingerprint image.

As the average voltage level of response signal is adjusted to the reference voltage through the offset canceling unit 250, regardless of the situation where the apparatus for detecting the fingerprint operates, the change (pixel variation) according to the operation environment of each sensor pad 120 itself may be minimized. As a result, the quality of fingerprint image acquired may be uniform.

Figure 10:
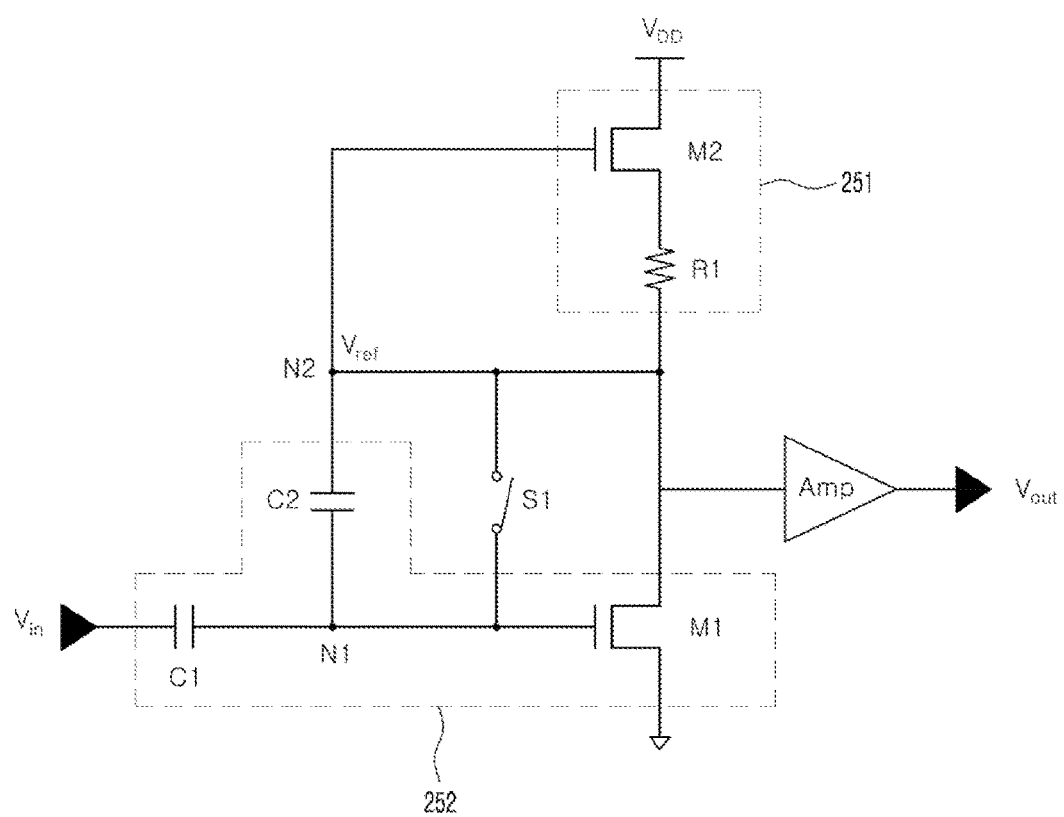
FIG. 10 is a view illustrating a shape where an amplifier is added to the offset canceling unit according to an embodiment of the present invention.

FIG. 10 is a view illustrating a shape where an amplifier is added to the offset canceling unit 250 according to an embodiment of the present invention.

According to an embodiment of FIG. 10, the amplifier is added to the output end of the offset canceling unit 250 so that the output voltage having the offset cancelled from the reference voltage may be amplified. The amplifier may amplify the input to output it, and lower output resistance other than the signal amplification. According to an embodiment, the amplifier may be replaced with other devices such as a plurality of buffers, etc. which can perform signal amplification or signal fixation.

According to an embodiment, as the response signal outputted based on the constant reference voltage with the offset cancelled is amplified by the amplifier in the offset canceling unit 250, only the difference in voltage which varies depending on the valley and ridge of the fingerprint is amplified. Accordingly, when acquiring a fingerprint image by detecting the difference in change in capacitance, an image with a clear difference in the valley and ridge of the fingerprint may be acquired.

According to an embodiment, a plurality of amplifiers may be connected in series. For example, by using a two-stage amplifier connecting two amplifiers, much greater voltage gain may be obtained, and noise may be more reduced than the case of using one amplifier.

Figure 11:
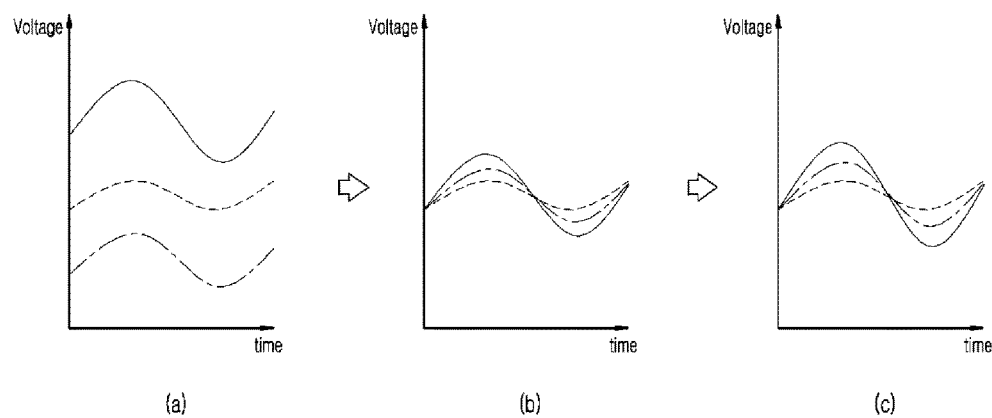
FIG. 11 is a view schematically illustrating the cancellation of the offset in various states according to an embodiment of the present invention

FIG. 11 is a view schematically illustrating the cancellation of the offset in various states according to an embodiment of the present invention.

Referring to FIG. 11(a), the response signal from the sensor pads 120 may form different offset levels according to the internal design, operation environment, external environment, etc. of the apparatus for detecting the fingerprint.

First, the case of canceling the offset by the data sample and hold unit 211 and offset sample and hold unit 212 will be explained.

Referring to FIG. 11(b), the offset may be adjusted before the response signals (that is, sensing signals) are amplified at PGA 230 through the data sample and hold unit 211 and offset sample and hold unit 212. As stated above, PGA 230 may cancel the offset included in the output signal OUTPUT detected from the sensing circuit 140 by subtracting the output signal of the offset sample and hold unit 212 from the output signal of the data sample and hold unit 211.

Referring to FIG. 11(c), the output signal with the adjusted state of offset is amplified by PGA 230, and accordingly, the difference according to the valley and ridge of the fingerprint contacting the apparatus for detecting the fingerprint may be more emphasized.

The offset detected from the offset sample and hold unit 212 is subtracted from the output signal OUTPUT detected from the sensing circuit 140 according to the application of driving signal $V_{drv}$, and the offset is adjusted in PGA 230 and the signal is amplified.

When the offset is canceled by the offset canceling unit 250, the response signals (that is, sensing signals) in FIG.

11(b) adjust the offset based on the reference voltage from the offset canceling unit 160 through the sample and hold unit 220. According to an embodiment, the average voltage of response signal may be the reference voltage, and the offset may be adjusted so that the starting voltage of response signal applied to the offset canceling unit 250 could be the reference voltage.

Specifically, the offset adjusting unit in the offset canceling unit 250 compares the reference voltage level provided by the reference voltage providing unit with the voltage level of response signal from the plurality of sensor pads 120. When the voltage of response signal is lower than the reference voltage, the voltage of response signal is raised as much as the corresponding difference. In a contrary case, the voltage of response signal may be lowered.

Referring to FIG. 11(c), the response signal with the adjusted voltage offset is amplified by the amplifier included in the offset canceling unit 250, and accordingly, the difference in the response signal may be more emphasized.

According to the above-mentioned embodiments, a response signal amplified where the offset is adjusted is converted into the digital signal through the ADC 300, and the apparatus for detecting the fingerprint combines the converted digital signal to acquire fingerprint image. The fingerprint image acquired by adjusting the response signal (sensing signal) as above may be an image with a constant quality with a minimized offset by the change according to the operation environment of each sensor pad 120, and the valley and ridge in the fingerprint image may be clearly distinguished. Additionally, by acquiring an image with a constant quality, user authentication, etc. performed by the apparatus for detecting the fingerprint is rapidly performed. Accordingly, the time which the user needs to contact his finger to the apparatus for detecting fingerprint may be shortened.

Although the exemplary embodiments of the present invention have been disclosed for illustrative purposes, those skilled in the art will appreciate that various modifications, additions and substitutions are possible, without departing from the scope and spirit of the present invention as disclosed in the accompanying claims. Therefore, it should be understood that the forgoing description is by way of example only, and is not intended to limit the present invention. For example, each constituent explained in singular form may be carried out being dispersed, and likewise, constituents explained as being dispersed may be carried out in combined forms.

The scope of the present invention is defined by the foregoing claims, and it is intended that the present invention covers the modifications or variations of the present invention provided they come within the scope of the appended claims and their equivalents.

EXPLANATION ON REFERENCE NUMERALS

110: bezel
120: sensor pad
130: sensor array
140: sensing circuit
200: sensing signal adjusting unit
210, 220: sample and hold unit
211: data sample and hold unit
212: offset sample and hold unit
250: offset canceling unit
251: reference voltage providing unit
252: offset adjusting unit
230, 253: PGA
240: DSG
300: ADC

What is claimed is:

1. An apparatus for detecting a fingerprint, comprising:
a plurality of sensor pads receiving a response signal from a finger applied to a driving signal;
a sensing circuit outputting a sensing signal based on the response signal;
a sensing signal adjusting unit sampling the sensing signal outputted from the sensing circuit, maintaining the sensing signal, and adjusting an average voltage level of the sensing signal based on a reference voltage,
wherein the sensing signal adjusting unit comprises an offset canceling unit canceling an offset between the sampled sensing signals,
wherein the offset canceling unit comprises an offset adjusting unit adjusting an average voltage level of the sensing signal based on the reference voltage, and
wherein the offset adjusting unit comprises:
a first capacitor connecting an input end where a response signal from the sensor pad is inputted and a response signal input node; and
a second capacitor connecting a reference voltage node and the response signal input node.

2. The apparatus of claim 1, wherein the sensing signal adjusting unit comprises:
a sample and hold unit sampling the sensing signal.

3. The apparatus of claim 2, wherein the offset canceling unit comprises:
a reference voltage providing unit providing the reference voltage.

4. The apparatus of claim 3, wherein the reference voltage providing unit, comprises:
a transistor where an input voltage is applied to a drain electrode, and the reference voltage is applied to a gate electrode, the transistor being connected to the reference voltage node; and
a resistor where one end is connected to a source electrode of the transistor, and another end is connected to the reference voltage node.

5. The apparatus of claim 3, wherein the offset adjusting unit comprises:
a transistor where the reference voltage node to which the reference voltage is applied is connected to the drain electrode, and the gate electrode is connected to the input node.

6. The apparatus of claim 3, further comprising an amplifier amplifying an output signal from the offset adjusting unit.

* * * * *